United States Patent [19]

Ishio et al.

[11] 4,039,961
[45] Aug. 2, 1977

[54] DEMODULATOR FOR COMBINED DIGITAL AMPLITUDE AND PHASE KEYED MODULATION SIGNALS

[75] Inventors: Hideki Ishio; Seizo Seki, both of Yokosuka; Kazuhiro Miyauchi, Tokyo, all of Japan

[73] Assignee: Nippon Telegraph and Telephone Public Corporation, Tokyo, Japan

[21] Appl. No.: 611,545

[22] Filed: Sept. 8, 1975

[30] Foreign Application Priority Data

Sept. 12, 1974  Japan .................................. 49-105607
May 28, 1975  Japan .................................. 50-63031

[51] Int. Cl.² .......................... H03D 3/00; H03D 5/00; H04L 27/22
[52] U.S. Cl. .................................. 329/50; 325/346; 325/349; 329/105; 329/112; 329/122; 329/135; 329/167
[58] Field of Search .............. 329/50, 135, 104, 105, 329/112, 122, 126, 146, 147, 167; 325/346, 349

[56] References Cited

U.S. PATENT DOCUMENTS 3,849,730  11/1974  Ho ......................................... 325/329
3,878,475  4/1975  Okano et al. ..................... 329/112 X

*Primary Examiner*—Siegfried H. Grimm
*Attorney, Agent, or Firm*—Burgess, Ryan and Wayne

[57] ABSTRACT

A digital carrier signal demodulation circuit is used in the carrier digital transmission system utilizing a 16-ary APK (Amplitude and Phase Keying) signal produced by the vector superposition of a second path signal consisting of a four-phase shift keying signal upon each phase of a first path signal consisting of a four-phase shift keying signal, the level of the second path signal being lower than that of the first path signal. The received 16-ary APK signal is detected with the reference carrier extracted from the received signal, regenerated to reproduce the base band pulses of the first path signal. The recovered base band pulses remodulate the reference carrier to produce the first path signal. The phases of the recovered first path signal and received signal are compared to phase lock a voltage controlled oscillator thereby producing the reference character.

7 Claims, 18 Drawing Figures

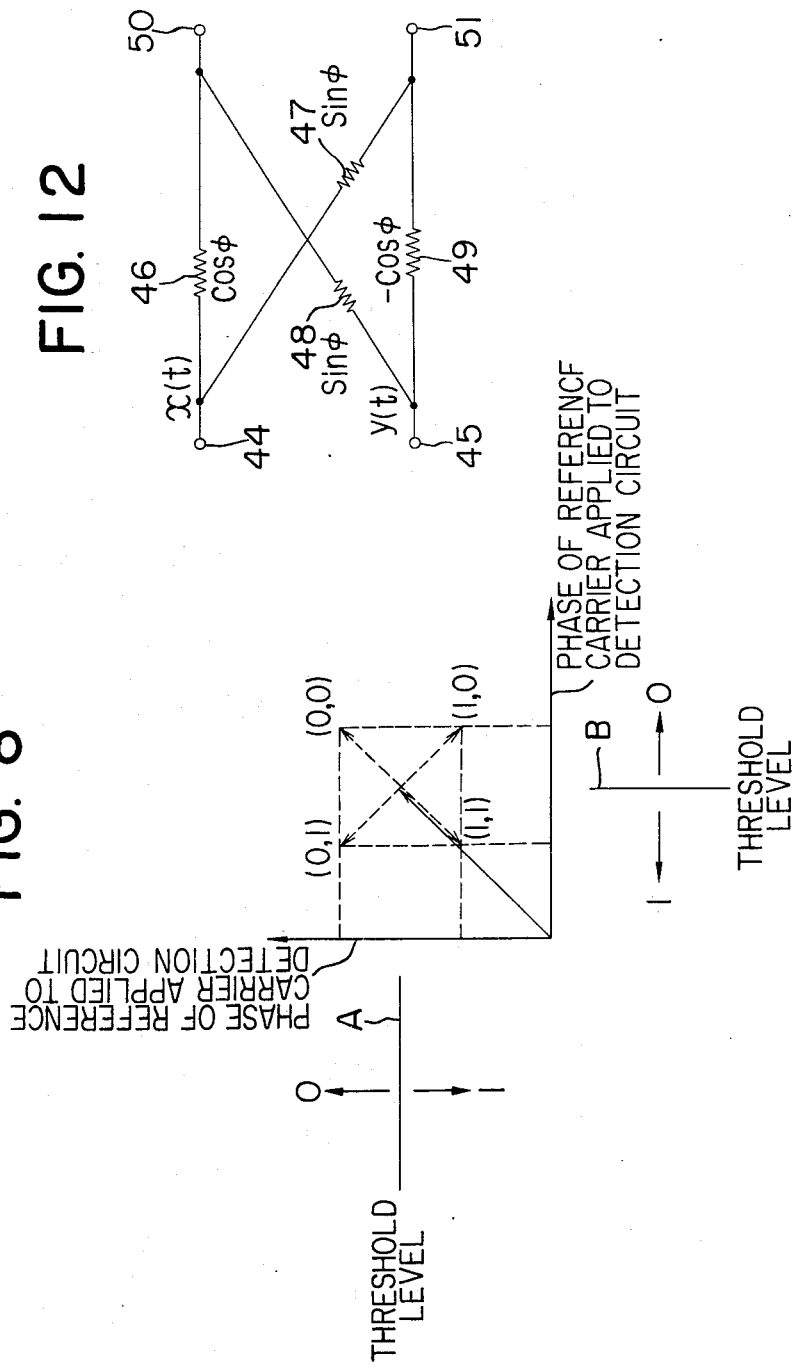

FIG. 9 (TABLE 1)

| CODES TRANSMITTED | | PHASE STATES OF RECOVERED CARRIER | | | | | | | |
|---|---|---|---|---|---|---|---|---|---|
| | | 0 PHASE | | π/2 PHASE | | π PHASE | | −π/2 PHASE | |
| ch3 | ch4 | ch3' | ch4' | ch3' | ch4' | ch3' | ch4' | ch3' | ch4' |
| ○ | ○ | ○ | ○ | — | ○ | — | — | ○ | — |
| ○ | — | ○ | — | ○ | ○ | — | — | — | — |
| — | — | — | — | — | — | ○ | ○ | — | ○ |
| — | ○ | — | ○ | — | — | ○ | — | ○ | ○ |

FIG. 13 (TABLE 2)

| 2ND PATH SIGNAL TRANSMITTED | | PHASE STATES OF RECOVERED CARRIER ($\theta'_n$) | | | | | | | |
|---|---|---|---|---|---|---|---|---|---|
| | | 0 | | $\pi/2$ | | $\pi$ | | $-\pi/2$ | |
| $\theta^2_n$ | BASE BAND CODES | OUTPUT FROM 24 | OUTPUT FROM 25 | OUTPUT FROM 24 | OUTPUT FROM 25 | OUTPUT FROM 24 | OUTPUT FROM 25 | OUTPUT FROM 24 | OUTPUT FROM 25 |
| 0 | O  O | O | O | — | O | — | — | O | — |
| $\pi/2$ | O  — | O | — | O | O | — | O | — | — |
| $\pi$ | —  — | — | — | O | — | O | O | — | O |
| $-\pi/2$ | —  O | — | O | — | — | O | — | O | O |

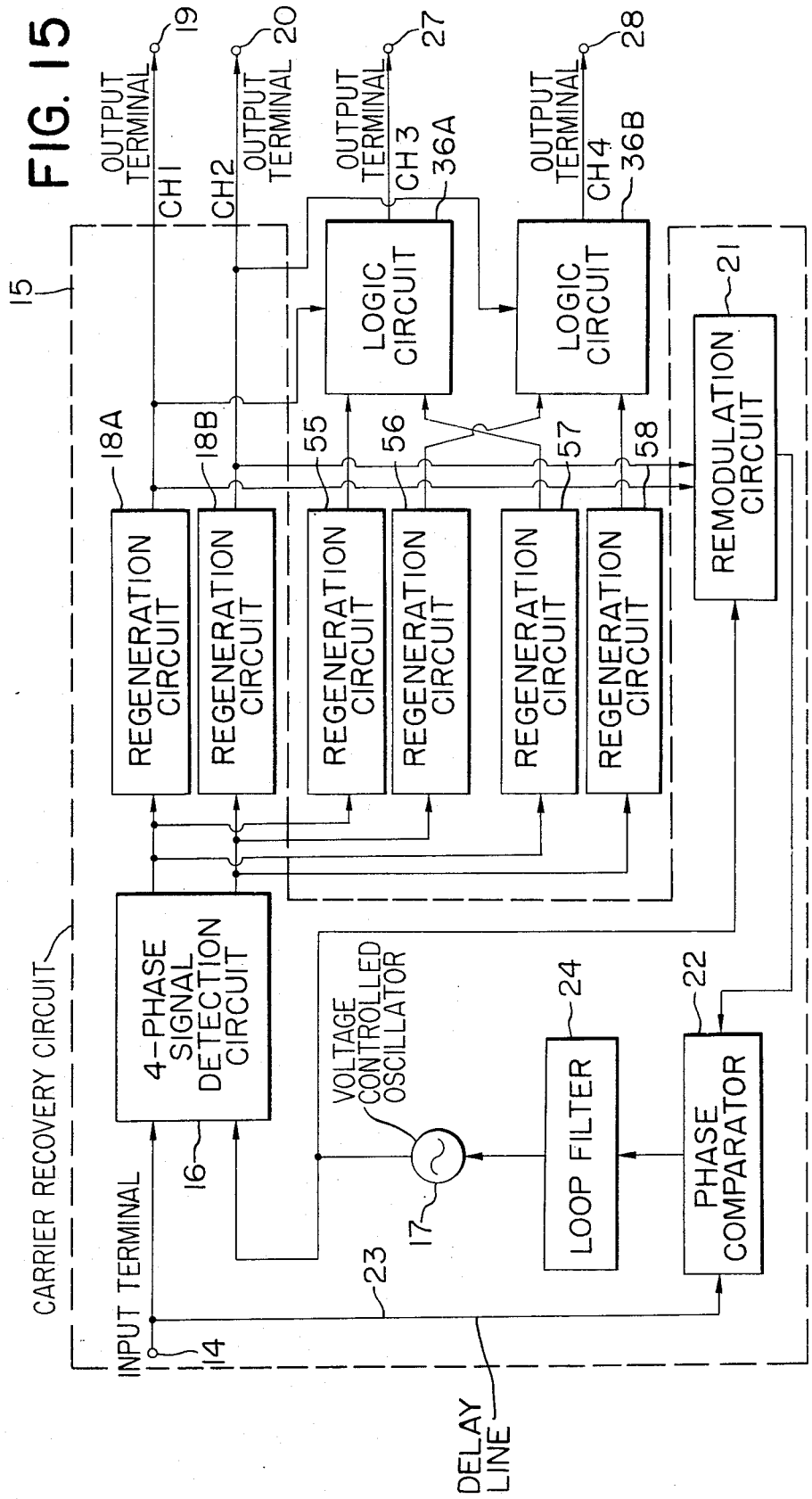

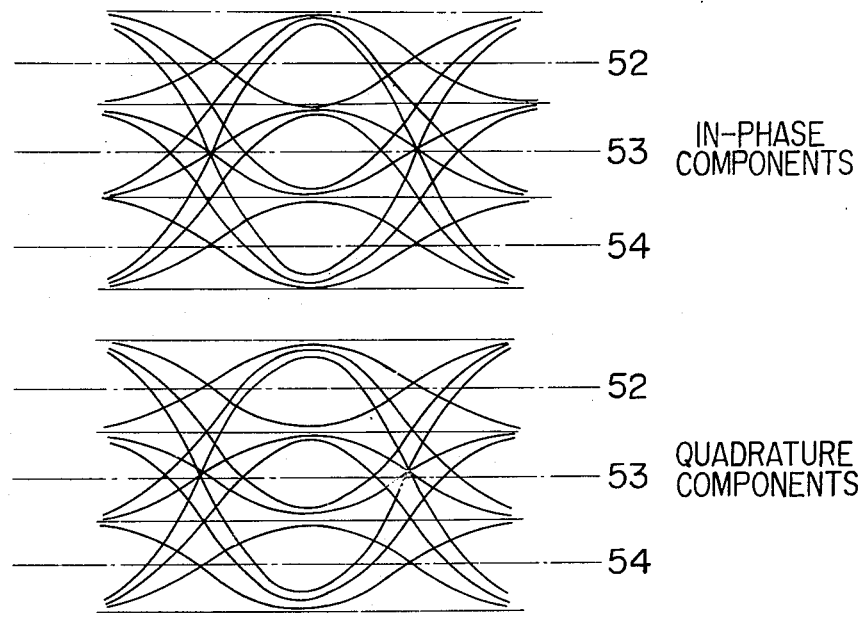

FIG. 18

TABLE 3

| VECTORS OF RECEIVED SIGNALS | 1ST QUADRANT | | | | 2ND QUADRANT | | | | 3RD QUADRANT | | | | 4TH QUADRANT | | | |
|---|---|---|---|---|---|---|---|---|---|---|---|---|---|---|---|---|
| | 100 | 101 | 102 | 103 | 200 | 201 | 202 | 203 | 300 | 301 | 302 | 303 | 400 | 401 | 402 | 403 |
| OUTPUT FROM 18A | O | O | O | O | O | O | O | O | — | — | — | — | — | — | — | — |
| OUTPUT FROM 18B | O | O | O | O | — | — | — | — | — | — | — | — | O | O | O | O |
| OUTPUT FROM 55 | O | O | — | — | O | — | — | — | — | — | — | — | — | O | — | O |
| OUTPUT FROM 56 | — | — | O | — | — | O | — | — | — | — | — | — | O | — | — | — |
| OUTPUT FROM 57 | O | O | O | O | O | O | O | O | O | O | — | — | O | O | — | — |
| OUTPUT FROM 58 | O | O | O | O | O | O | O | O | O | O | O | — | O | O | O | O |

DEMODULATOR FOR COMBINED DIGITAL AMPLITUDE AND PHASE KEYED MODULATION SIGNALS

BACKGROUND OF THE INVENTION

The present invention relates to a digital carrier signal demodulation circuit for use in carrier digital transmission in which the carrier is modulated with a plurality of base band signals or pulses.

For the transmission of digital information there have been devised and used various modulation methods such as ASK (Amplitude Shift Keying), PSK (Phase Shift Keying) and FSK (Frequency Shift Keying). Among them the four-phase shift keying method or 4 PSK is most frequently used, but it has a distinct defect that the information transmittable by this method is only two bits per symbol. The four-phase shift keying method is therefore not necessarily an efficient modulation method.

One of the methods for improving the efficiency of the four-phase shift keying method is to increase a number of modulation phases to 8,16 and so on, but this improvement results in the rapid degradation in margin for noise as the number of modulation phases is increased. One of the methods for improving the efficiency of the amplitude modulation method is also to increase the number of levels used to 4,8 and so on, but this method also results in the rapid degradation in margin for noise as the number of levels used is increased.

The methods for overcoming the above defects by simultaneously modulating both the amplitude and phase are disclosed in, for instance, U.S. Pat. Nos. 3,619,503 and 3,805,191. These methods called Amplitude and Phase Shift Keying or APSK are very advantageous over the conventional amplitude and phase modulation methods in that the phase-amplitude plane is utilized in a very efficient manner so that they are very excellent digital information transmission methods.

In amplitude and phase shift keying, a reference signal whose phase is in exact synchronism with that of the carrier produced in a transmitter must be produced in a receiver for demodulating the received signal. As compared with the phase modulation, it is extremely difficult to extract the reference signal from the received signal except a special case of amplitude and phase shift keying. To carry out the conventional amplitude and phase shift keying methods, logic circuits and digital-to-analog converts with complicated structure must be provided so that the high speed signal transmission cannot be attained. Mainly because of the reasons described above, even though the amplitude and phase shift keying methods provide an excellent communication system, so far they have not been utilized in practice yet. Furthermore, high-speed amplitude and phase shift keying has never been utilized in practice.

SUMMARY OF THE INVENTION

One of the objects of the present invention is therefore to provide a digital carrier signal demodulation circuit adapted for use in the high speed signal transmission.

Another object of the present invention is to provide a digital carrier signal demodulation circuit simple in construction yet capable of increasing the information transmission rate.

A further object of the present invention is to provide a digital carrier signal demodulation circuit simple in construction yet stable, in operation.

To the above and other ends, briefly stated, the present invention provides a digital carrier signal demodulation circuit. This demodulation circuit utilizes a carrier recovery circuit comprising a four-phase signal detection circuit for detecting the received input signal with the reference carrier, a regeneration circuit for regenerating the output signal from the detection circuit to reproduce the base band pulses of a first path signal in said received input signal, a remodulation circuit for re-modulating the reference carrier with the reproduced base band pulses, thereby producing the first path signal, a phase comparator for comparing the phase of the first path signal with the phase of the received input signal, and a voltage-controlled oscillator for changing the phase of the reference carrier in response to the output from the phase comparator; and a demodulation circuit for demodulating by a second path signal the base band pulses of the first path signal produced by the re-modulation and the received input signal.

BRIEF DESCRIPTION OF THE DRAWING

FIG. 1 being a block diagram of a four-phase modulation circuit,

FIG. 2 being an vector diagram of the output signals from the four-phase modulation circuit shown in FIG. 1, FIG. 3 being a block diagram of a modulation circuit for producing the 16-ary APK signals, and FIG. 4 being a vector diagram of the output signals therefrom;

FIG. 8 is a diagram used for the explanation of the mode of operation of the third embodiment;

FIG. 9 is a table used for explaining the operational mode of the third embodiment;

FIG. 12 is a circuit diagram of a phase-shift circuit used in the fifth embodiment;

FIG. 13 is a table used for the explanation of the mode of operation of the fifth embodiment;

FIGS. 14 and 15 are block diagrams of a sixth and seventh embodiments, respectively, of the present invention;

FIGS. 16, and 17 are diagrams used for the explanation of the seventh embodiment shown in FIG. 15; and FIG. 18 is a table used for the explanation of the mode of operation of the seventh embodiment;

Same reference numerals are used to designate similar parts throughout the figures.

DESCRIPTION OF THE PREFERRED EMBODIMENTS:

Prior to the description of the preferred embodiments of the present invention, a modulation circuit for producing digital carrier signals will be described with reference to FIGS. 1 through 4.

Figure 1:
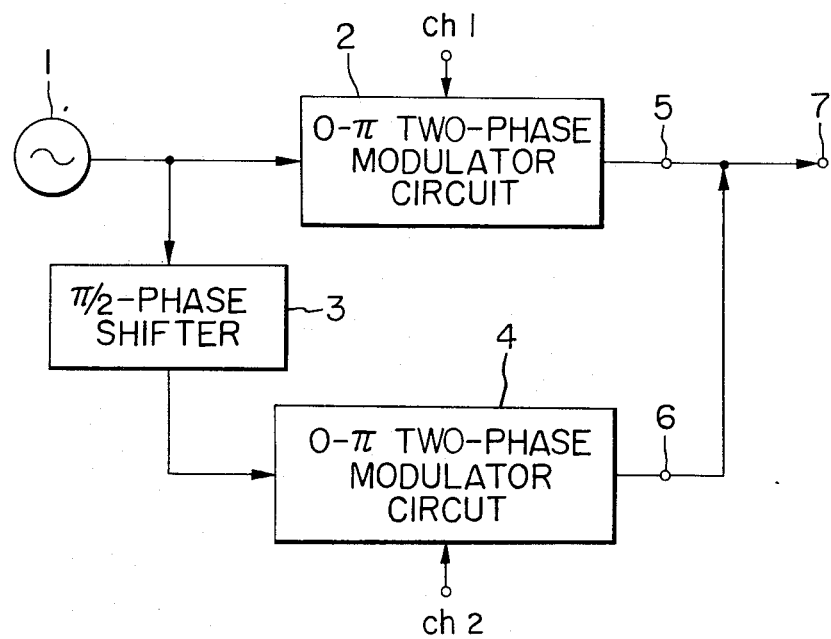
FIGS. 1 through 4 are diagrams used for the explanation of the modulation system used in conjunction with the digital carrier signal demodulation circuits in accordance with the present invention.
Figure 2:
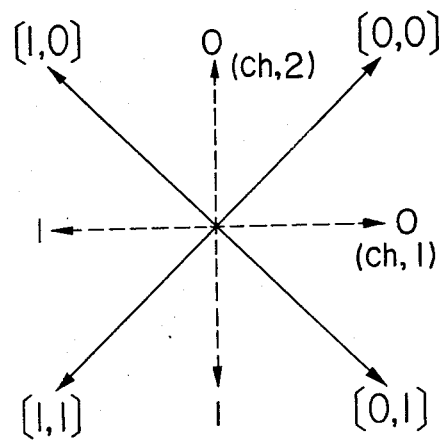

First referring to FIG. 1 showing in block diagram a 4-phase modulation circuit, when the carrier from a carrier source 1 is applied to a first 0-$\pi$ two-phase modulator circuit 2 and to a second 0-$\pi$ two-phase modulator 4 through a $\pi/2$ phase shifter 3, the modulated signal; that is (0), (1) on the X-axis shown in FIG. 2, is derived from the output terminal 5 of the first modulator in response to either of the state 0 or 1 of the base band pulse applied to a signal input terminal ch1. In like manner, in response to the base band pulse applied to a second signal input terminal ch2, the modulated signal; that is, (0) or (1) on the Y-axis shown in FIG. 2 is derived from the output terminal 6 of the second modulator 4. When these two modulated signals are synthesized or combined, derived from an output terminal 7 is the four-phase modulated signal of $\pi/4$, $3\pi/4$, $5\pi/4$ or $7\pi/4$ in response to the combination (0,0), (1,0), (1,1) or (0,1) of the states of the base band signals applied to the input terminals ch1 and ch2 as shown in FIG. 2.

Figure 3:
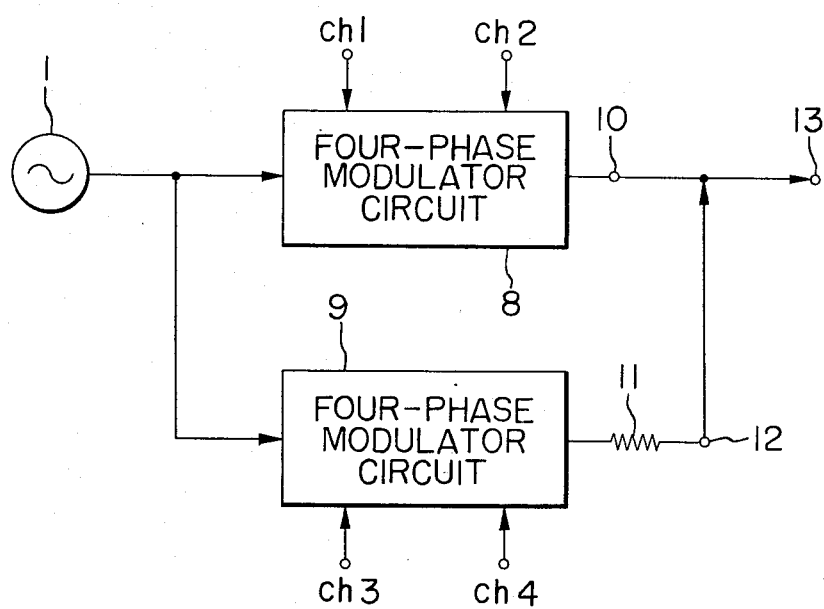
Figure 4:
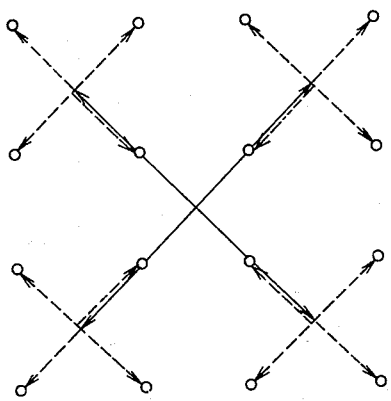

Next referring to FIG. 3, a modulation circuit will be described which consists of two modulators of the type described above with reference to FIG. 2 for producing the 16-ary APK signal (16-ary APSK signal). That is, the carrier from the carrier source 1 is applied to a first and a second four-phase modulation circuits 8 and 9, and the base band signals are applied to the input terminals ch1 and ch2. The four-phase modulated signals described with reference to FIG. 2 are derived from an output terminal 10 in the manner described above, and are indicated by the solid lines in FIG. 4. The output signal from the first modulation circuit 8 will be referred to as the first path signal hereinafter in this specification. In like manner, in response to the base band pulses applied to signal input terminals ch3 and ch4 of the second modulation circuit 9, the four-phase modulated signal is derived from the output terminal thereof, but the output demodulated signal is attenuated by an attenuator 11 so that the four-phase modulated signals indicated by the dotted lines in FIG. 4 are derived from an output terminal 12. The output modulated signal from the second modulation circuit will be referred to as the "second path signal" hereinafter in this specification. When the first and second path signals are superposed upon each other by a hybrid circuit or directional coupler, the 16-ary APK signals are derived from an output terminal 13 as shown in the signal space diagram in FIG. 4. As indicated by the solid lines in FIG. 4, the first path signal is the signal in the form of vector and modulated in phase by $\pi/4$, $3\pi/4$, $5\pi/4$ or $7\pi/4$ while the second path signal is the modulated signal vector which is shown as being extended from the terminal of the first path signal vector and modulated by $\pi/4$, $3\pi/4$, $5\pi/4$ or $7\pi/4$. When these first and second path signal vectors are combined, 16 modulated signal vectors may be derived. When the amplitude of the second path signal is within a certain range, the resultant vector of the addition of the second path signal vector to the first path signal vector which is in one of the four quadrants will not be extended out of the quadrant in which the first path signal vector presents.

FIRST EMBODIMENT, FIG. 5

Figure 5:
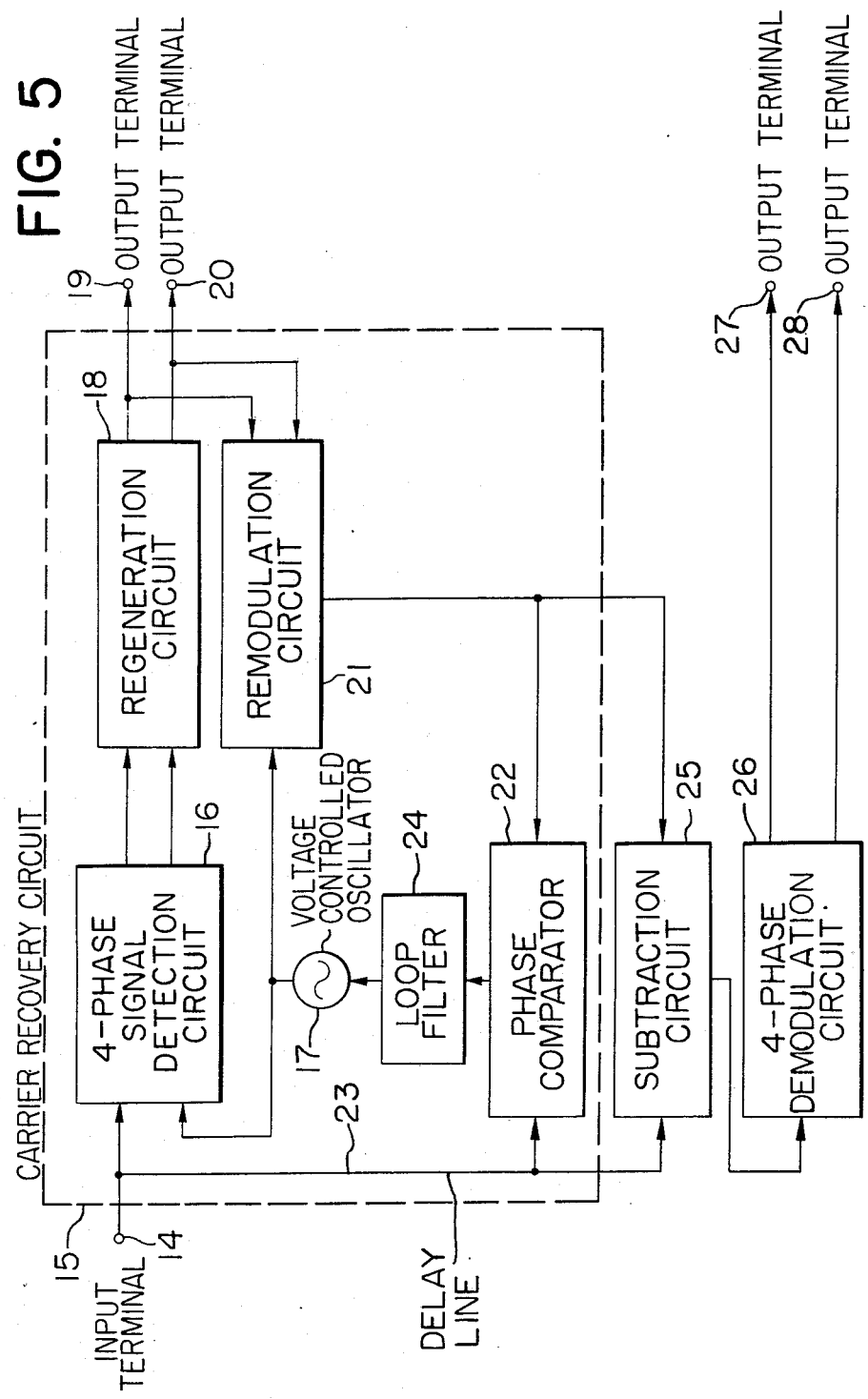
FIG. 5 is a block diagram of a first embodiment of the present invention.

Referring to FIG. 5, the first embodiment of a demodulation circuit in accordance with the present invention will be described. The input 16-ary APK signal is applied from an input terminal 14 to a four-phase signal detection circuit 16 in a carrier recovery circuit 15 (a block indicated by the dotted lines) to be coherently detected with the reference carriers of the X-and Y-axes phase shown in FIG. 4 which is produced by a voltage controlled oscillator 17. The detected output is discriminated by a regeneration circuit 18 in order to detect the quadrant in which the signal vector is present (See FIG. 4), and the outputs derived from output terminals 19 and 20 correspond to the base band pulses applied to the input terminals ch1 and ch2 shown in FIG. 3.

The outputs from the regeneration circuit 18 are also applied to a re-modulation circuit 21 in order to modulate the reference carrier from the oscillator 17 into the four-phase modulated signal corresponding to the signal vector indicated by the solid line segment in FIG. 4. That is, the first path signal is regenerated. The first path signal is applied to a phase comparator 22, to which is also applied the input signal which has been delayed by a delay line 23 by a time equal to the signal transmission delay time from the input terminal to the output of the re-modulation circuit 21. The output from the phase comparator 22 which compares the phase between the first pulse signal and the input signal from the input terminal 14, is applied through a loop filter 24 to the oscillator 17 as the control voltage. Since one of the two input signals applied to the phase comparator 22 is the first path signal while the other, the resultant or sum signal of the addition of the first and second path signal vectors, their amplitudes and phases are not exactly coincident, but the second path signal may be considered as an interference signal to the first path signal so that when the difference in level between the first and second path signals is suitably selected, the satisfactory operation of the loop controlling the oscillator 17 may be ensured.

The output from the re-modulation circuit 21 is also applied to a subtraction circuit 25 where it is vectorially subtracted from the input signal from the input terminal 14. The output from the subtraction circuit 25 is the second path signal corresponding to the signal vector indicated by the dotted line segment in FIG. 4. The second path signal is applied to a four-phase demodulation circuit 26 so that the four-phase PSK signal corresponding to the base band pulses applied to the input terminals ch3 and ch4 (see FIG. 3) may be derived from output terminals 27 and 28.

Figure 6:
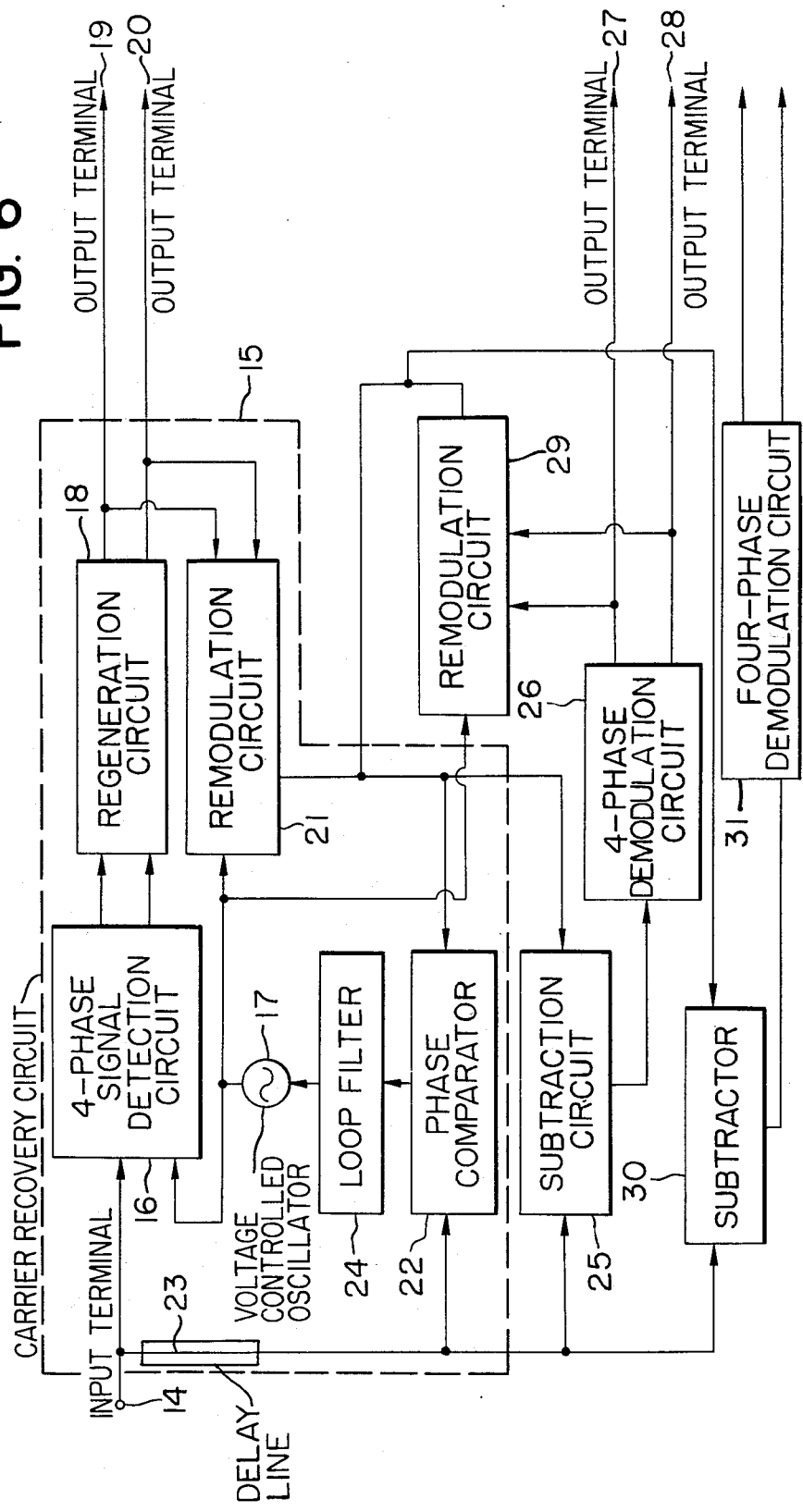
FIG. 6 is a block diagram of a second embodiment of the present invention.

Second Embodiment, FIG. 6

The second embodiment shown in FIG. 6 is substantially in construction to the first embodiment shown in FIG. 5 except that a re-modulation circuit 29, a subtractor 30 and a four-phase demodulation circuit 31 are additionally connected. Thus, the second embodiment is capable of demodulating 64-ary APK signal. That is, when the four-phase modulated signals regenerated by the re-modulation circuits 21 and 29 are combined, the 16-ary APK signal shown in FIG. 4 is derived. When the 64-ary APK signal; that is, the input signal is subtracted vectorially from the regenerated 16-ary APK signal in the subtractor 30, the third path signal; that is, the 4-PSK signal is obtained by vectorially subtracting the 16-ary APK signal demodulated in FIG. 5 from the 64-ary APK signal. By demodulating the four-phase modulated signal by the four-phase demodulation circuit 31, the base band pulses corresponding to the third path signal are regenerated.

As described above, in general, the $2^{2(k+2)}$-ary APK signal may be demodulated by a circuit configuration consisting of a number of $k$ cascade-connected unit or fundamental circuits each consisting of a re-modulation circuit, a subtractor and a four-phase demodulation circuit.

Figure 7:
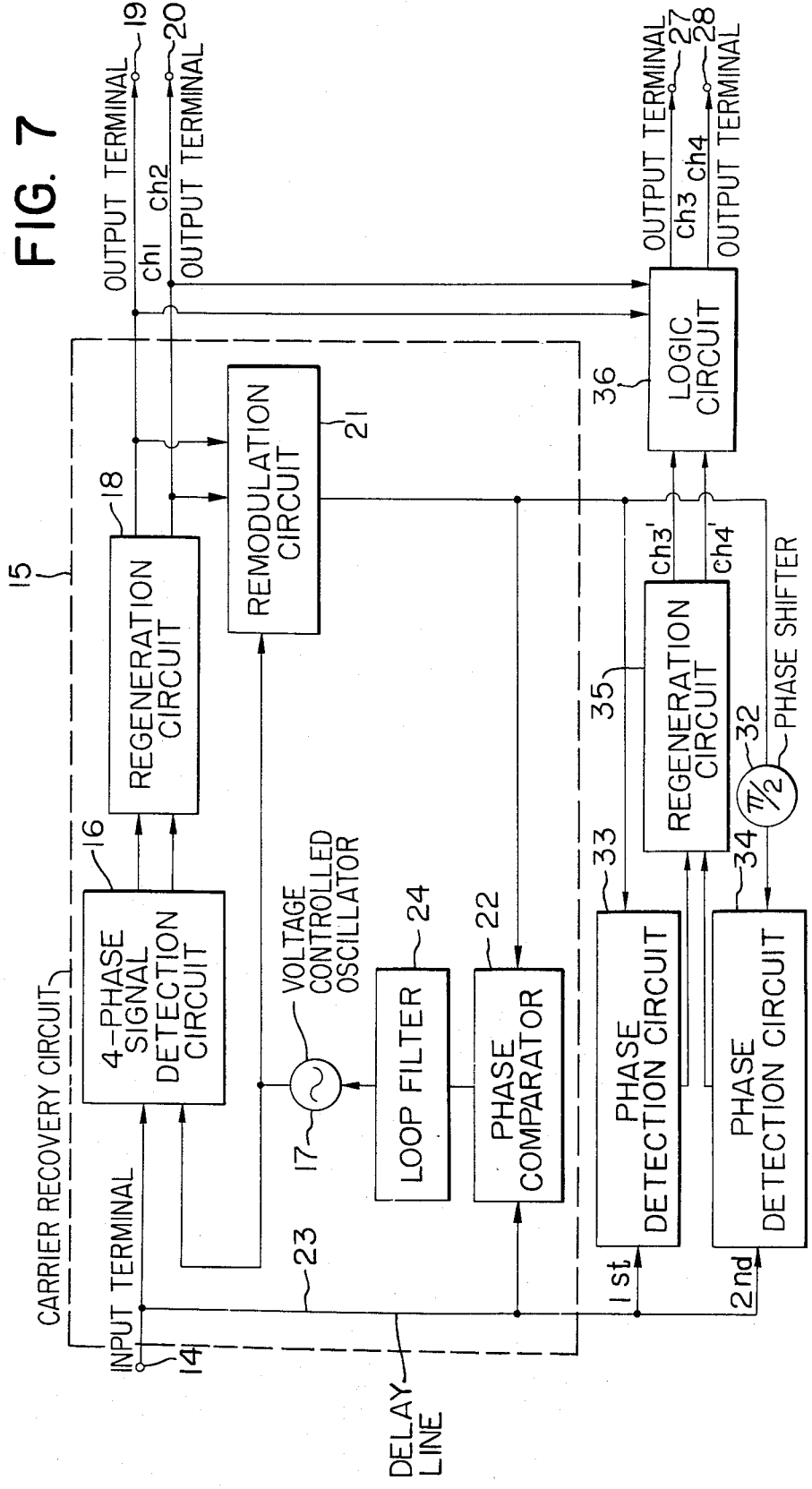
FIG. 7 is a block diagram of a third embodiment of the present invention.

Third Embodiment, FIG. 7

In the first embodiment described above, the accurate amplitude and phase adjustments and controls are required to perform the vector subtraction, and moreover the operations are adversely affected by the environmental conditions such as temperature change. Furthermore, the construction is complicated because two four-phase demodulation circuits must be used.

The third embodiment shown in FIG. 7 was made to overcome the above other defects encountered in the first embodiment. Referring to FIG. 7, the carrier recovery circuit 15 is substantially similar in construction to that of the first embodiment shown in FIG. 5. That is, the base band pulses applied to the input terminals ch1 and ch2 (See FIG. 3) are regenerated and derived from the output terminals 19 and 20, and the output from the re-modulation circuit 21 is the four-phase modulated signal or the first path signal corresponding to the signal vector indicated by the solid line segment in FIG. 4.

It is assumed that one at a time the four signals vectors which belong to the first quadrant of 16-ary APK signal shown in FIG. 4 are received as shown in FIG. 8. Then the carrier recovery circuit 15 is synchronized to one of the four phases of the first path signal, one of the four pairs of base band pulses (0,0), (1,0), (1,1) and (0,1) (See FIG. 2) are derived from the output terminals 19 and 20, and the output from the remodulation circuit 21 corresponds to one of the four solid line segments or four-phase modulated signal vectors shown in FIG. 2. Next assume that the output from the re-modulation circuit 21 is the signal corresponding to the signal vector indicated by the solid line segment in the first quadrant in FIG. 2 when the phase of the recovered carrier is 0 (zero) in the carrier recovery circuit 15. This output signal is applied not only to a first phase detection circuit 33 but also to a second phase detection circuit 34 through a phase shifter 32 so that the vector of the input signals to the first and second phase detectors 33 and 34 are out of phase by 90°. These vector signals are used as the reference carriers for detecting the received signal transmitted from the input terminal 14 to the first and second phase detectors 33 and 34. In a regeneration circuit 35, the outputs from the first and second phase detectors 33 and 34 are discriminated with reference to the threshold levels A and B (see FIG. 8) extending horizontally and vertically through the terminus of the vector of the first path signal, whereby one of the four pairs of the base band pulses applied to the input terminals ch3 and ch4 (0,0), (0,1), (1,1) and (1,0) corresponding to the dotted line segment vectors shown in FIG. 8 may be regenerated.

When the phase of the recovered carrier is one of the other three phases other than 0, the combination of the output pulses derived from the regeneration circuit 35 is different from that derived when the phase of the recovered carrier is 0 as shown in Table 1 FIG. 9. However, the combinations of the pulse outputs shown in Table 1 are the Gray code so that the outputs independent of the phase of the carrier recovered by the carrier recovery circuit 15 may be derived by modulo-4 addition of the Gray code by a logic circuit 36.

Figure 10:
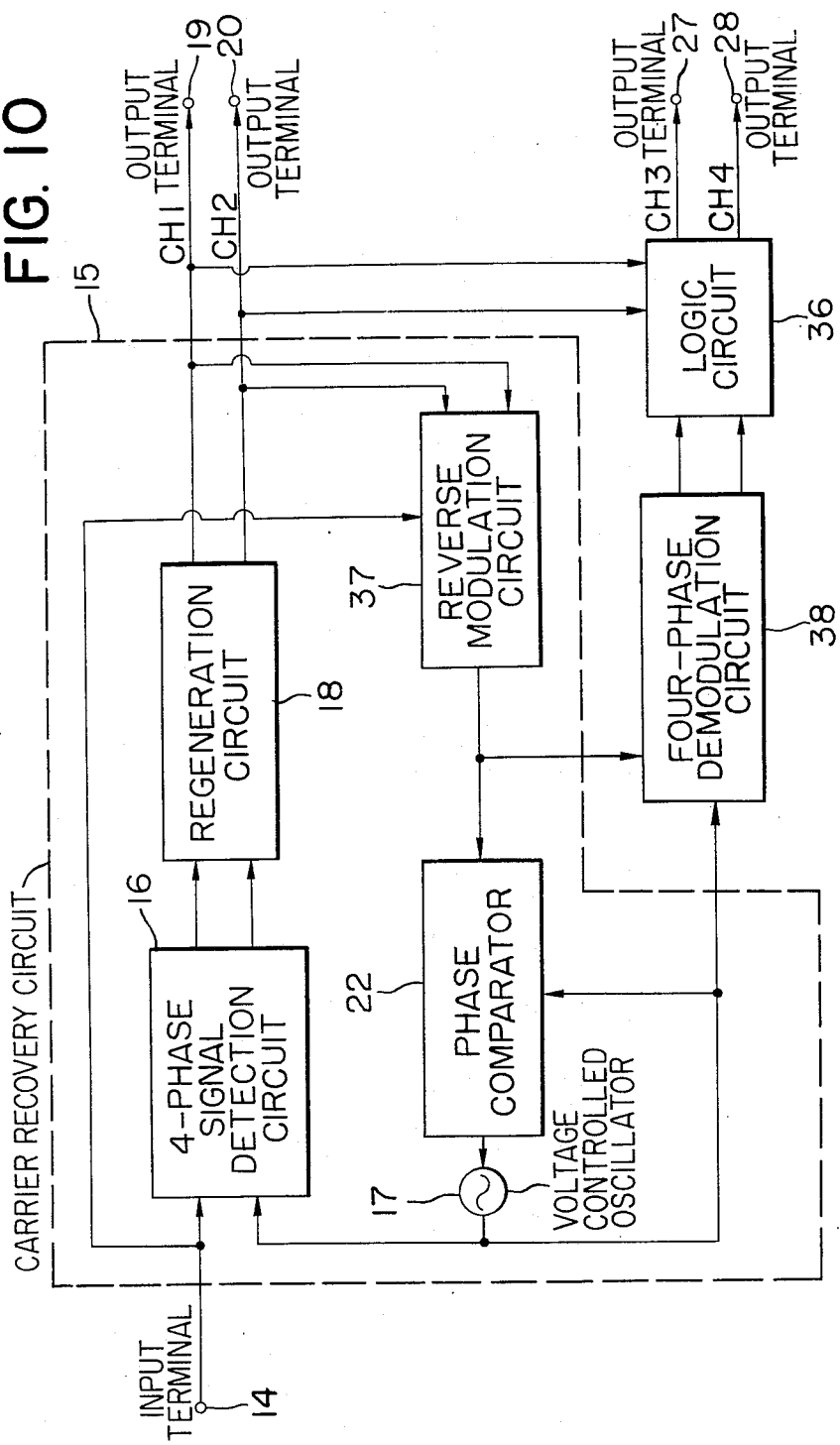
FIG. 10 is a block diagram of a fourth embodiment of the present invention.

Fourth Embodiment, FIG. 10

Referring to FIG. 10, the output from the regeneration circuit 18; that is, the regenerated base band pulses of the first path signal, reversely modulates the input signal from the input terminal 14 applied to a reverse modulation circuit 37 in the carrier recovery circuit 15, and the output phase from the reverse modulation circuit 37 is compared with the phase of reference carrier from the voltage-controlled oscillator 17 in the phase comparator 22 so that the synchronization of the carrier recovery circuit 15 may be attained. In response to the reference carrier from the oscillator 17 and the output from the reverse modulation circuit 37, a four-phase demodulation circuit 38 reproduces the base band pulses corresponding to the second path signal, and the base band pulses from the four-phase demodulation circuit are added in a logic circuit 36 to the base band pulses of the first path signal from the regeneration circuit 18, whereby the base band pulses applied to the input terminals ch3 and ch4 may be regenerated.

Figure 11:
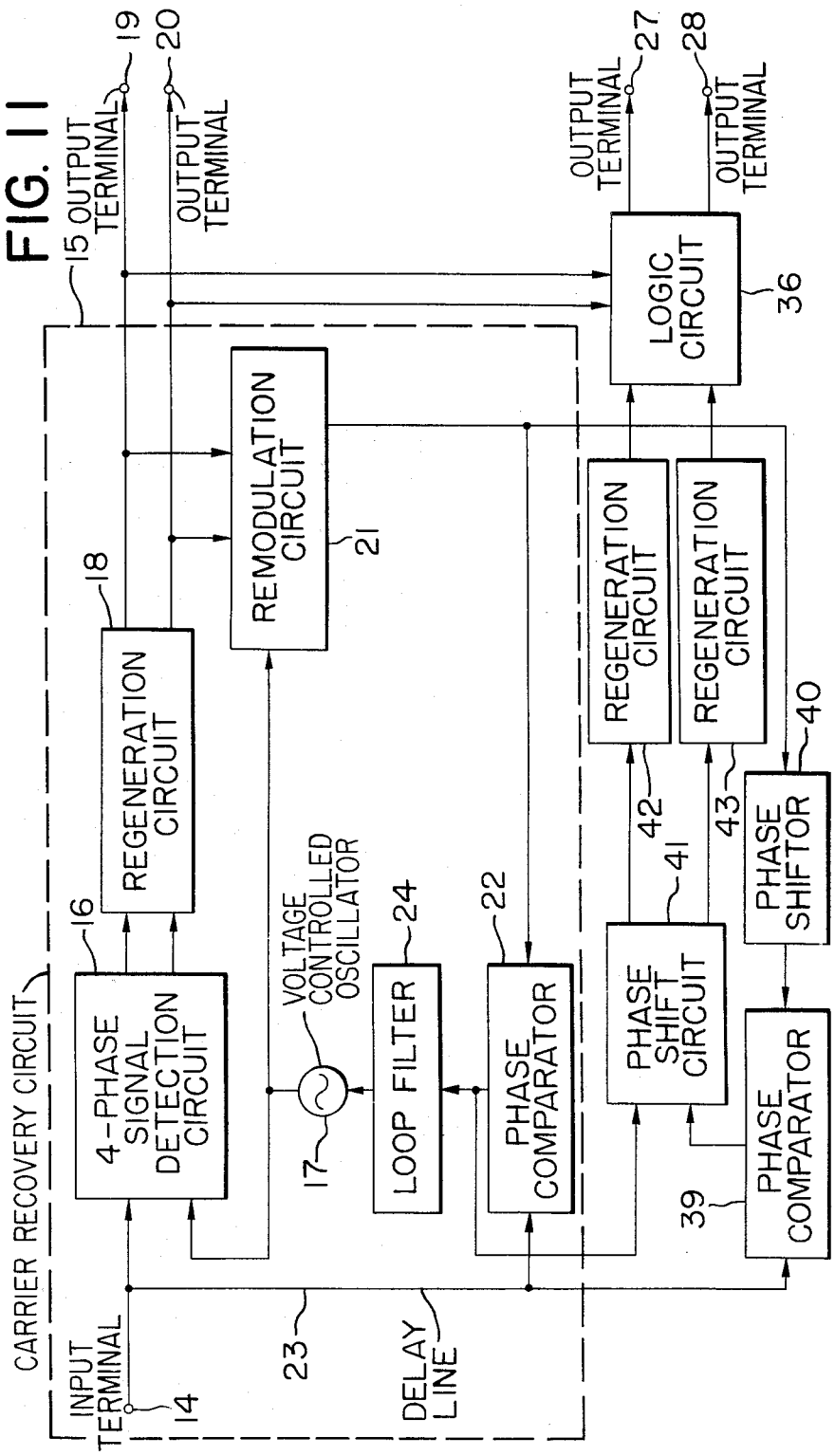
FIG. 11 is a block diagram of a fifth embodiment of the present invention.

Fifth Embodiment, FIG. 11

The fifth embodiment shown in FIG. 11 is rather simple in construction, and consists of the carrier recovery circuit 15, a phase comparator 39, a phase shifter 40, a phase-shift circuit 41 and two regeneration circuits 42 and 43, and is capable of demodulating the 16-ary APK signal.

When the output from the remodulation circuit 21 in the carrier recovery circuit 15; that is, the four-phase modulated signal of the first path signal and the received signal from the input terminal 14 are applied to the phase comparator 22, the latter gives the output including the second path signal information because the received signal includes the superposed second path signal. The output from the remodulation circuit 21 is also applied to a phase shifter 40, and the output from the phase shifter 40 which is shifted in phase by $\pi/2$ relative to the input, is applied to the phase comparator 39 to be compared with the received signal from the input terminal 14. The outputs from the phase comparators 23, 39 are applied to the phase-shift circuit 41.

As shown in FIG. 12, the phase-shift circuit 41 comprises two input terminals 44 and 45, two output terminals 50 and 51 and four resistors 46, 47, 48 and 49. The output from the phase comparator 22 is applied to the input terminal 44 and transmitted through the resistors 46 and 47 to the output terminals 50 and 51. The output from the phase comparator 39 is applied to the input terminal 45 and transmitted through the resistors 48 and 49 to the output terminals 50 and 51. The resistors 46, 47, 48 and 49 are selected to have the values $\cos\phi$, $\sin\phi$, $\sin\phi$ and $-\cos\phi$, respectively.

The 16-ary APK signal M(t) and the four-phase PSK signal P(t) may be expressed in the forms of:

$$M(t) = \sum_{n=-\infty}^{\infty} \{A_1\sin(\omega t + \theta_n^1) + A_2\sin(t + \theta_n^2)\}$$

$$P(t) = \sum_{n=-\infty}^{\infty} A_1\sin(\omega t + \theta_n^1)$$

where
- $A_1$ and $A_2$ = amplitudes of the first and second path signals, respectively,
- $\omega$ = carrier frequency, and
- $\theta_n^1$ and $\theta_n^2 = 0, \pi/2, \pi,$ or $-\pi/2$.

The outputs $x(t)$ and $y(t)$ from the phase comparator 22 may be expressed in the forms of:

$$x(t) = \sum_{n=-\infty}^{\infty} \{A_1^2 \sin(\theta_n^1 - \theta_n^1) + A_1 A_2 \sin(\theta_n^2 - \theta_n^1)\}$$

$$y(t) = \sum_{n=-\infty}^{\infty} \{A_1^2 \cos(\theta_n^1 - \theta_n^1) + A_1 A_2 \cos(\theta_n^2 - \theta_n^1)\}$$

When these outputs are combined at a suitable ratio between $\cos \phi$ and $\sin \phi$ in the phase-shift circuit 41, the outputs $P_1$ and $P_2$ in the following expressions may be derived from the output terminals 50 and 51, respectively:

$$P_1 = \sum_{n=-\infty}^{\infty} \{A_1^2 \sin(\theta_n^1 - \theta_n^1 + \phi) + A_1 A_2 \sin(\theta_n^2 - \theta_n^1 + \phi)\}$$

$$P_2 = \sum_{n=-\infty}^{\infty} \{A_1^2 \cos(\theta_n^1 - \theta_n^1 + \phi) + A_1 A_2 \cos(\theta_n^2 - \theta_n^1 + \phi)\}$$

When $\phi = \pi/4$, then $$P_1 = \sum_{n=-\infty}^{\infty} \{\frac{A_1^2}{\sqrt{2}} + A_1 A_2 \sin(\theta_n^2 - \theta_n^1 + \pi/4)\}$$

$$P_2 = \sum_{n=-\infty}^{\infty} \{\frac{A_1^2}{\sqrt{2}} + A_1 A_2 \cos(\theta_n^2 - \theta_n^1 + \pi/4)\}$$

These two detection outputs are discriminated in the regeneration circuits 42 and 43 in such a way that the latter produce base band pulse 0 or 1 depending upon whether detection outputs have the level higher or lower than a threshold level $(A_1^2/\sqrt{2} + A_1 A_2/2)$. Thus the base band pulses are regenerated as shown in Table 2 in FIG. 13 depending upon the relationship between the phases $\theta_n^1$ and $\theta_n^2$.

The modulo-4 addition in the logic circuit of the outputs from the regeneration circuits 42 and 43 and the output from the regeneration circuit 18 results in the regeneration of the base band pulses applied to the input terminals ch3 and ch4 (see FIG. 4).

SIXTH EMBODIMENT, FIG. 14

Figure 14:
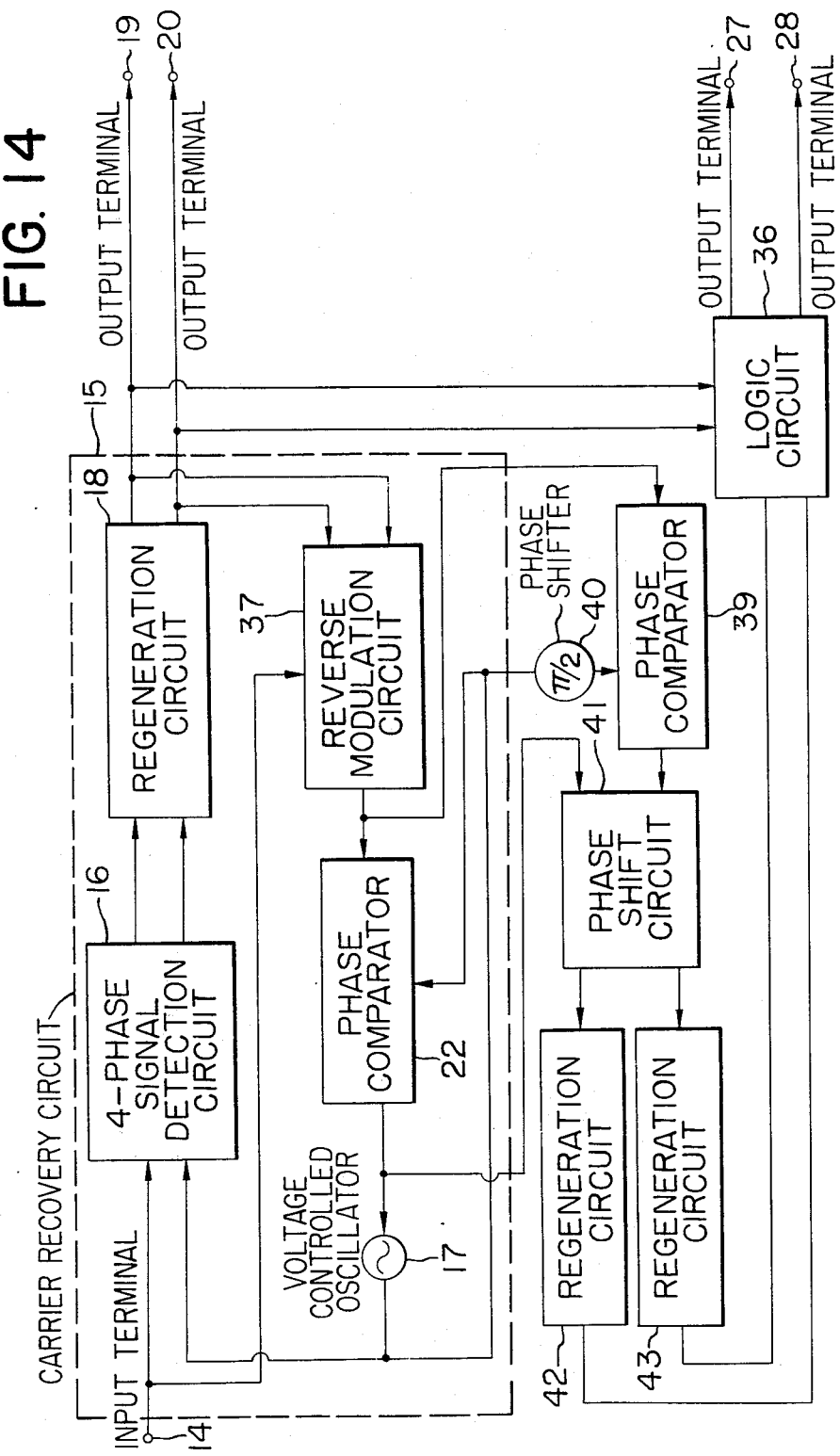

The sixth embodiment shown in FIG. 14 comprises the carrier recovery circuit 15 of the type including the reverse-modulation circuit 37 shown in FIG. 10 and the circuit assembly consisting of the logic circuit 36, the phase comparator 39, the phase shifter 40, the phase-shift circuit 41 and the regeneration circuits 42 and 43 shown in FIG. 11.

In the reverse-modulation circuit 37, the received signal from the input terminal 14 is reversely modulated with the output pulse from the regeneration circuit 18 that is, the regenerated base band pulses of the first path signal. The output from the reverse-modulation circuit 37 is applied to the phase comparator 22, and since the output of the reverse modulation circuit 37 includes the second path signal information, the output from the comparator 22 includes the base band pulse information of the second path signal. The output from the oscillator 17 is delayed by $\pi/2$ by the phase shifter 40 and applied to the second phase comparator 39 to be compared with the reversely modulated output so that the output which is out of phase by 90° relative to the output from the phase comparator 22 may be derived from the second phase comparator. As described in the fifth embodiment shown in FIG. 11, the outputs from the first and second phase comparators 22 and 39 are processed by the phase-shift circuit 41, the regeneration circuits 42 and 43 and the logic circuit 36 so that the base band pulses of the second path signal may be regenerated and derived from the output terminals 27 and 28.

SEVENTH EMBODIMENT, FIG. 15

The carrier recovery circuit 15 comprises the four-phase signal detection circuit 16, the voltage-controlled oscillator 17, two regeneration circuits 18A and 18B, the remodulation circuit 21, the phase comparator 22, the delay line 23 and the loop filter 24. As described elsewhere, since the 16-ary APK signal consists of two four-phase modulated signals; that is, the first and second path signals which are superposed one upon the other, the second path signal may be considered as a kind of the interference signal to the first path signal. Therefore, when the level of the interference or second path signal is lower than that of the first path signal to some extent, the carrier recovery circuit 15 is synchronized in phase to the first path signal. Therefore, as shown in the detected eye patterns in FIG. 16, the in-phase and quadrature components of the 16-ary APK signal may be derived from the four-phase signal detection circuit 16. The first regeneration circuits 18A and 18B have the threshold level equal to the center level 53 shown in FIG. 16.

In the seventh embodiment, the output terminals of the detection circuit 16 is further connected to regeneration circuits 55, 56, 57 and 58 with a threshold level different from that of the first regeneration circuits 18A and 18B. That is, the regeneration circuits 55, 56 have the threshold levels 52 and the regeneration circuits 57, 58 have the threshold level 54 shown in FIG. 16. The outputs from the regeneration circuits 55 and 57 are applied to the logic circuit 36A while the outputs from the regeneration circuits 56 and 58, to the logic circuit 36B. In response to the outputs from the regeneration circuits 18A and 18B, the logic circuits 36A and 36B are controlled so as to select the input and give the outputs to the output terminals 27 and 28, respectively.

As shown in FIG. 17, the vectors of the individual 16 signals of 16-ary APK signals are assigned with the numbers 100 through 103, 200 through 203, 300 through 303 and 400 through 403. The signals with the numbers 100 through 103 correspond to the signal vectors in the first quadrant shown in FIG. 4, and represent the combinations of the base band pulses (0000), (0001), (0011) and (0010). In like manner, the signals with the numbers 200 through 203, 300 through 303 and 400 through 404 correspond the vectors in the second, third and fourth quadrants, respectively, shown in FIG. 4, and represent the base band pulse combinations included in the parentheses in FIG. 17. To discriminate the 16-ary APK signal with the three different threshold levels means to divide the phase amplitude plane into 16 areas 100 through 403 identified by the four-bit codes, respectively, as shown in FIG. 17.

When the detection output from the detection circuit 16 is higher than the threshold levels 52, 53 and 54, respectively, the outputs of the regeneration circuits 18A, 18B, 55, 56, 57 and 58 are 0s, but when the detection output is lower than the threshold levels 52, 53 and 54, the outputs are 1s. The combinations of the outputs from the regeneration circuits 18A, 18B, 55, 56, 57 and 58, therefore, corresponding to the signals shown in FIG. 17. That is, six series of pulses may be regenerated as shown in FIG. 18. In order to obtain the pulse coded signals in the parentheses shown in FIG. 17, the outputs from the regeneration circuits 18A, 18B, 55 and 56 are derived for the 16-ary APK signals in the first quadrant; the outputs from the regeneration circuits 18A, 18B, 55 and 58 are derived from the 16-ary APK signals in the second quadrant; the outputs from the regeneration circuits 18A, 18B, 57 and 58 are derived for the signals in the third quadrant; and the outputs from the 18A, 18B, 57 and 56 are derived for the signals in the fourth quadrant. That is, when the output from the regeneration circuit 18A is 0, the output from the regeneration circuit 55 is selected, but when the former is 1, the output from the regeneration circuit 57 is selected. In like manner, depending upon whether the output from the regeneration circuit 18B is 0 or 1, the output from the regeneration circuit 56 or 58 is selected. Thereafter, the outputs of the two selected series may be processed to obtain the demodulated signal output. Therefore, the logic circuit 36A passes the output from the regeneration circuit 55 when the output from the regeneration circuit 18A is 0, but passes the output from the regeneration circuit 57 when the output from the circuit 18A is 1. Same is true for the logic circuit 36B. Thus, four base band pulse trains or series may be derived from the output terminals 19, 20, 27 and 28.

What is claimed is:

1. A digital carrier signal demodulation circuit comprising
   A. a carrier recovery circuit comprising
      a. a four-phase signal detection circuit means for detecting a received input signal with a reference carrier,
      b. a regeneration circuit responsive to the detected received input signal for regenerating base band pulses of a first path signal in said received input signal,
      c. remodulation circuit means for remodulating said reference carrier with said regenerated base band pulses, thereby regenerating said first path signal,
      d. a phase comparator means for comparing the phase of said first path signal with that of the received input signal, and
      e. a voltage-controlled oscillator means for providing said reference carrier phase locked to the output from said phase comparator; and
   B. a demodulation circuit means for regenerating base band pulses of a second path signal from said first path signal and said received input signal.

2. A digital carrier signal demodulation circuit as set forth in claim 1 wherein said demodulation circuit means for regenerating the base band pulses of said second path signal comprises
   a. a subtraction circuit means for subtracting the first path signal from said remodulation circuit from said received input signal, and
   b. a four-phase demodulation circuit means for demodulating the output from said subtraction circuit means.

3. A digital carrier signal demodulation circuit as set forth in claim 2, wherein said demodulation circuit means comprises N circuit stages, each kth stage ($1 \leq K \leq N$) comprising (i) subtracting means, (ii) means for demodulating the output of the ($k-1$)th stage subtracting means to provide a kth path digital signal, (iii) a remodulation circuit coupled to said voltage-controlled oscillator and said demodulating means for generating a kth output signal corresponding to the output of said oscillator phase modulated in accordance with said kth path digital signal, (iv) means for coupling said received input signal to an input terminal of the ($k-1$)th subtracting means, (v) means for combining said kth output signal with the ($k-1$)th output signal of the preceding stage to produce a composit signal, and (vi) means for coupling said composite signal to another input terminal of said ($k-1$)th stage subtracting means, the output of said ($k-1$)th stage subtracting means corresponding to the difference between the input signals thereto.

4. A digital carrier signal demodulation circuit as set forth in claim 1 wherein
   said demodulation circuit means for regenerating the base band pulses of said second path signal comprises
      (a) means for providing a phase signal corresponding to the phase difference between said received input signal and the output of said remodulation circuit means phase displaced 90°, a phase-shift circuit means for combining in a ratio of a sine $\theta$ and a cosine $\theta$ the output from said phase comparator and the phase signal,
      b. a further regeneration circuit means for discriminating the output from said phase-shift circuit means, and
      c. a logic circuit means for decoding the output from said further regeneration circuit means by adding the base band pulses of said first path signal.

5. A digital carrier signal demodulation circuit as set forth in claim 1 wherein said demodulation circuit means for regenerating the base band pulses of said second path signal comprises
   a. a plurality of additional regeneration circuit means each connected to the output terminals of said four-phase detection circuit and having a threshold level different from that of said first mentioned regeneration circuit, and
   b. a plurality of logic circuit means for selectively passing the outputs from said additional regeneration circuit means in response to the base band pulses of said first path signal from said first mentioned regeneration circuit.

6. A digital carrier signal demodulation circuit as set forth in claim 1 wherein
   said demodulation circuit means for regenerating the base band pulses of said second path signal comprises
      a. a first phase detection circuit means for comparing the phase of the first path signal from said remodulation circuit with the phase of said received input signal,
      b. a second phase detection circuit means for comparing the phase of said received input signal with the phase of said first path signal which has been shifted in phase by $\pi/2$, and
      c. logic circuit means for discriminating the outputs from said first and second phase detection circuits, and for decoding said discriminated outputs by adding the base band pulses of said first path signal.

7. a digital carrier signal demodulation circuit comprising
   A. a carrier recovery circuit comprising a. a four-phase signal detection circuit means for detecting a received input signal with a reference carrier,
b. a regeneration circuit responsive to the detected received input signal for regenerating base band pulses of a first path signal in said received input signal,
c. a reverse-modulation circuit means for reversely modulating said received input signal with the base band pulses of said first path signal, thereby reproducing the carrier;
d. a phase comparator means for comparing the phase of said reference carrier with the phase of the signal provided by said reverse-modulation circuit, thereby providing a phase difference signal, and
e. a voltage-controlled oscillator means for providing said reference carrier phase locked to the phase difference signal from said phase comparator; and
B. a demodulation circuit means for regenerating base band pulses of a second path signal from said first path signal and said received input signal.

* * * * *

UNITED STATES PATENT OFFICE
CERTIFICATE OF CORRECTION

Patent No. 4,039,961   Dated August 2, 1977

Inventor(s) Hideki Ishio, et al

It is certified that error appears in the above-identified patent and that said Letters Patent are hereby corrected as shown below:

Column 1, line 48: After "except" insert --in--.

line 51: "converts" should be --converters--.

line 52: "the" should be deleted.

line 57: "yet" should be deleted.

line 63: "the" should be deleted.

Column 2, line 33: "an vector" should be --a vector--.

line 60: "embodiments" should be --embodiment--.

Column 4, lines 55 & 56: After "substantially" insert --similar--.

UNITED STATES PATENT OFFICE
CERTIFICATE OF CORRECTION

Patent No. 4,039,961  Dated August 2, 1977

Inventor(s) Hideki Ishio, et al

It is certified that error appears in the above-identified patent and that said Letters Patent are hereby corrected as shown below:

Column 7, line 5: "$\theta_n^1$ and $\theta_n^2$" should be --$\theta_n^1$ and $\theta_n^2$--.

line 10: In the formula, before "$A_1^2$" an open brace ( { ) should be inserted.

line 13: In the last part of the formula, " $+ A_1A_2 \cos(\theta_n^1 - \theta_n^1)\}$ " should be -- $+ A_1A_2 \cos(\theta_n^2 - \theta_n^1)\}$ --.

line 39: "$(A_1^2/\sqrt{2}$ " should be --$(A_1^2/\sqrt{2}$ --.

line 42: "$\theta_n^1$ and $\theta_n^2$" should be --$\theta_n^1$ and $\theta_n^2$ --.

Column 8, line 35: "is" should be --are--.

line 56: "404" should be --403--.

UNITED STATES PATENT OFFICE
CERTIFICATE OF CORRECTION

Patent No. 4,039,961　　　　　Dated August 2, 1977

Inventor(s) Hideki Ishio, et al

It is certified that error appears in the above-identified patent and that said Letters Patent are hereby corrected as shown below:

Column 10, line 11: "composit" should be --composite--.

In the Drawings:

Figure 16, next to phrase "QUADRATURE COMPONENTS" the numerals "52", "53" and "54" should be --55--, --56-- and --57-- respectively.

Figure 17, on the right hand side: The numerals "52", "53" and "54" should be --55--, --56-- and --57-- respectively.

Signed and Sealed this

Twenty-eighth Day of February 1978

[SEAL]

Attest:

RUTH C. MASON　　　　　LUTRELLE F. PARKER
Attesting Officer　　　Acting Commissioner of Patents and Trademarks